UNITED STATES PATENT OFFICE.

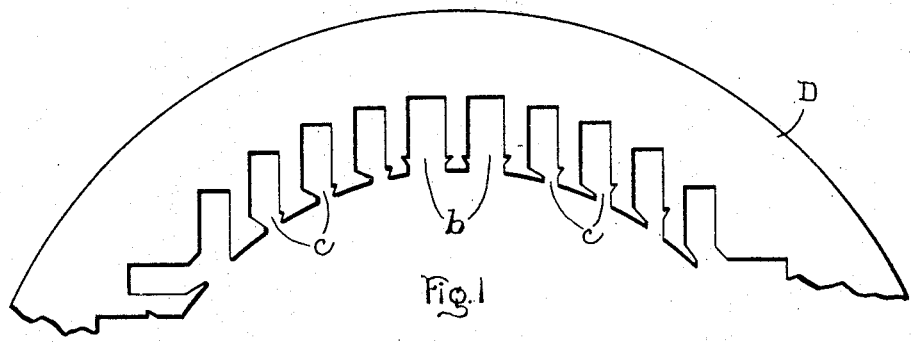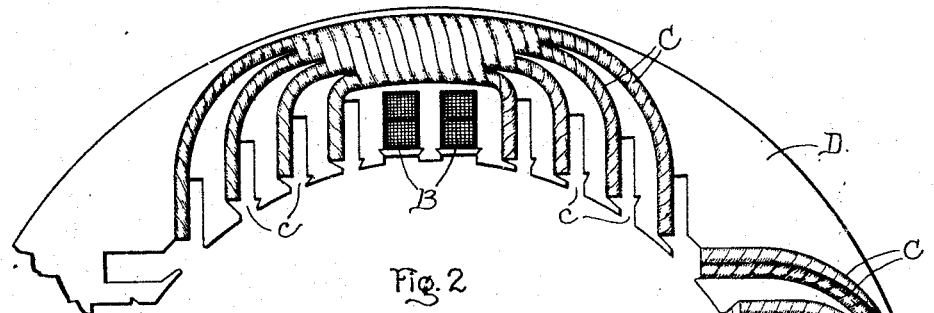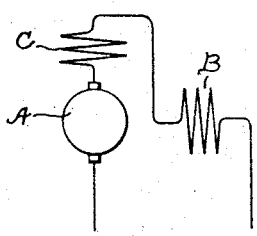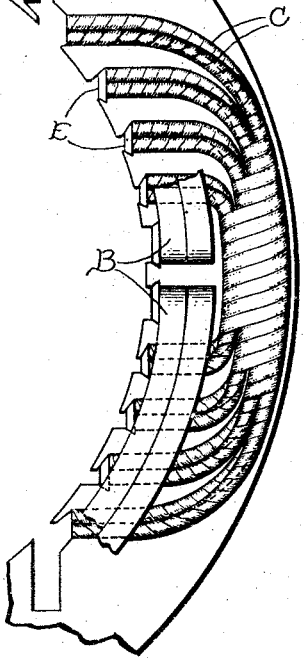

FRED B. HOWELL, OF SCHENECTADY, NEW YORK, ASSIGNOR TO GENERAL ELECTRIC COMPANY, A CORPORATION OF NEW YORK.

DYNAMO-ELECTRIC MACHINE.

956,855.　　　　　Specification of Letters Patent.　　Patented May 3, 1910.

Application filed October 14, 1907.　Serial No. 397,275.

*To all whom it may concern:*

Be it known that I, FRED B. HOWELL, a citizen of the United States, residing at Schenectady, county of Schenectady, State of New York, have invented certain new and useful Improvements in Dynamo-Electric Machines, of which the following is a specification.

My invention relates to dynamo-electric machines having polar distributed windings, that is, distributed windings in which the coils for each pole are distinct from, and do not overlap, the coils of adjacent poles. Such windings are commonly employed for the compensating windings of compensated series motors and for the inducing windings of repulsion motors.

The object of my invention is to provide an improved construction for such machines in which form-wound coils may be employed and the coils for any pole quickly removed and replaced without injury to them.

My invention in one aspect consists in forming the core with open slots adapted to receive the distributed winding, the sides of the slots for each pole being parallel the slots for each pole being overhung on one side only and all the slots for each pole being overhung on the same side. With this slot arrangement the coils for each pole may be arranged in two sets adapted to lie side by side in the slots and the coils of each set may be bound together before insertion in the slots. The two sets may then be slipped successively into the open sides of the slots, the first set being moved into the overhung portions of the slots to make room for the insertion of the second set. Each set may quickly be removed bodily for inspection or repair at any time. Springing or bending the coils, which might injure their insulation, is rendered unnecessary by the parallel arrangement of the slots, which also facilitates replacing the coils.

My invention will best be understood by reference to the accompanying drawing, in which—

Figure 1 shows a portion of a slotted core arranged in accordance with my invention; Fig. 2 a portion of the core with a portion of the coils inserted; and Fig. 3 is a diagram of connections of a machine to which my invention is particularly applicable.

In Fig. 3, A represents the armature, B the field, and C the compensating winding of a compensated series motor. The compensating winding of such a machine is ordinarily distributed, and as heretofore constructed the coils of this winding are difficult to remove and to replace. By arranging the stator core, as shown in Fig. 1, removal of the coils is made easy. In the core D, large slots $b$ are provided for receiving the coils of the concentrated field winding B, while smaller slots $c$ are adapted to receive the compensating winding C.

Fig. 1 shows the portion of the core for one pole of the compensating winding. It will be seen that all the slots $c$ are open, being overhung on only one side, that the sides of the slots for each pole are parallel and that all the slots for each pole are overhung on the same side. By means of this construction a set of form-wound coils may be bound together and inserted in the slots. They are then moved into the overhung portions of the slots, so as to leave room for a second similar set of coils, as shown in the upper part of Fig. 2. In the right-hand part of this figure the second set of coils is shown in place. Wedges E, or other suitable maintaining means, may be used for securing the two sets of coils in place. By removing the wedges both sets of coils may be removed bodily, and since the slots for each of the windings are parallel, it is not necessary to spring or bend the coils in removing or replacing, so that the injury to insulation produced by bending is avoided.

What I claim as new and desire to secure by Letters Patent of the United States, is,—

1. In a dynamo-electric machine, a core having open slots adapted to receive a distributed winding, the slots being overhung on one side only, the sides of the slots for each pole of the winding being parallel and all the slots for each pole being overhung on the same side, and a distributed polar winding in said slots, the winding for each pole comprising two sets of form-wound coils placed side by side in said slots, each set of coils being bodily removable.

2. In a dynamo-electric machine, a core having open slots adapted to receive a distributed winding, the slots being overhung on one side only, the sides of the slots for each pole of the winding being parallel and all the slots for each pole being overhung on the same side, and a distributed winding in said slots, the winding for each pole comprising two sets of form-wound coils placed side by side in said slots, the coils of each set being bound together and bodily removable, and means for securing said sets in the slots.

3. In a dynamo-electric machine, a stator core provided with a concentrated winding and a distributed winding, the latter being carried in open slots overhung on one side only, the sides of the slots for each pole of the distributed winding being parallel and all the slots for each pole being overhung on the same side, said distributed winding comprising two sets per pole of form wound coils placed side by side in said slots, each set of coils being bodily removable.

4. In a dynamo-electric machine, a stator core provided with a concentrated winding and a distributed winding, the latter being carried in open slots overhung on one side only, all the slots for each pole of the distributed winding being overhung on the same side and the sides of the slots for each pole being parallel, said distributed winding comprising two sets per pole of form-wound coils placed side by side in the slots, the coils of each set being bound together and bodily removable.

In witness whereof, I have hereunto set my hand this 12th day of October, 1907.

FRED B. HOWELL.

Witnesses:
HELEN ORFORD,
ALEXANDER D. LUNT.